US006878212B1

(12) United States Patent
Pinatti et al.

(10) Patent No.: US 6,878,212 B1
(45) Date of Patent: Apr. 12, 2005

(54) APPARATUS AND PROCESS FOR PRE-HYDROLYSIS OF BIOMASS

(75) Inventors: Daltro Garcia Pinatti, Lorena (BR); Alvaro Guedes Soares, Mogi Miriam (BR)

(73) Assignee: RM Materials Refratarios LTDA, Lorena (BR)

( * ) Notice: Subject to any disclaimer, the term of this patent is extended or adjusted under 35 U.S.C. 154(b) by 184 days.

(21) Appl. No.: 10/018,360

(22) PCT Filed: Jun. 23, 2000

(86) PCT No.: PCT/BR00/00065

§ 371 (c)(1), (2), (4) Date: May 19, 2002

(87) PCT Pub. No.: WO00/78446

PCT Pub. Date: Dec. 28, 2000

(30) Foreign Application Priority Data

Jun. 23, 1999 (BR) .............................. 9902607

(51) Int. Cl.⁷ ............................................... F16J 12/00
(52) U.S. Cl. ........................ 127/1; 422/129; 422/198; 220/592.27
(58) Field of Search ............... 210/612, 761, 210/766, 175; 435/276; 422/129, 198, 265; 228/184, 221; 220/592.27; 127/1, 42; 137/1, 42

(56) References Cited

U.S. PATENT DOCUMENTS 3,056,664 A    10/1962  Dravnieks et al.
4,199,371 A    4/1980   Regnault et al.
4,257,818 A    3/1981   Regnault et al. ................ 127/1
4,304,608 A    12/1981  Regnault et al. ................ 127/1
4,997,124 A    3/1991   Kitabatake et al.
5,159,694 A    10/1992  Overath et al.
5,338,366 A    8/1994   Grace et al. ................... 127/37
5,411,594 A    5/1995   Brelsford ...................... 127/37
5,478,453 A  * 12/1995  Bernard et al. ............. 204/165
6,730,223 B1 *  5/2004  Anderson et al. ........... 210/612

FOREIGN PATENT DOCUMENTS

GB    1 569 138        6/1980
WO    WO 99/26720      6/1999
WO    WO 00/31459      6/2000
WO    WO 00/78899      12/2000

OTHER PUBLICATIONS

Resolution CONAMA No. 20 of Jun. 1986, published in the D.O.U. (Official Gazette) of Jul. 30, 1986.

* cited by examiner

*Primary Examiner*—David A. Reifsnyder
(74) *Attorney, Agent, or Firm*—Smith, Gambrell & Russell (57) ABSTRACT

An apparatus for the processing of pre-hydrolysis of biomass, particularly a reactor of the failsafe type, either mobile or not, which may be manufactured of microbonded carbon steel and coated with special material (refractory metals, plastics, etc.). The insertion of vacuum between the shell of the reactor and its coating prevents its implosion and permits the detection of leakage with the helium gas. The resistance to corrosion of the refractory metals enables carrying out of pre-hydrolysis and mineral digestion.

42 Claims, 6 Drawing Sheets

APPARATUS AND PROCESS FOR PRE-HYDROLYSIS OF BIOMASS

FIELD OF THE INVENTION

This invention relates to an apparatus, specifically a reactor, and to a process for pre-hydrolysis of any kind of biomass (wood, bagasse, straw, grass, vegetable residues, organic garbage, etc.) to obtain commercial products, such as cellulignin and sugar solutions, pre-hydrolysate layers, containing xylose, glucose, mamose, galactose, arabinose, acethylics, uranic acids, etc. This invention further enables one to manufacture reactors for the digestion of minerals, such as ilmenite, anatasie, columbite, pyrochlore, zirkonite, etc.

DESCRIPTION OF THE PRIOR ART

Chemical reactors are devices that are defined by a variety of processes for transforming materials, such as chemical, metallurgical, thermal, biotechnological, pharmaceutical materials, etc. Reactors are classified by three criteria:

a) classification according to vessels and flows: 1st) batch reactor; 2nd) semi-continuous reactor; 3rd) tank reactor with continuous mixer—RTMC; 4th) RTMC in series; 5th) tubular reactor; and 6th) recycling reactor.

b) classification according to the existing phases: 1st) reactors for gaseous phases; 2nd) reactors for liquid phases; 3rd) reactors for liquid and gaseous phases; 4th) reactors with solid catalysts; 5th) non-catalytic reactors involving solids (gas-solid, liquid-solid, and reactions of gaseous phases; 6th) reactors for electrochemical processes; 7th) reactors for biological processes; 8th) reactors for photochemical and radiochemical processes. The non-catalytic gas-solid and liquid-solid reactors with which, by way of example, the reactor of this invention should be compared, are listed below.

b.1) non-catalytic gas-solid reactor retort (tower-type reactor), movable bed reactor, multiple bed reactor, rotary oven reactor, fluid bed reactor, recirculating flow reactor, dust calciner (dust spray).

b.2) non-catalytic liquid-solid reactors: tank with a mixer (batch, semi-continuous, cascade—percentage of solids limited by the power of the mixer), tank with recirculation of liquids, rotary drum, fluid bed, kneading machine, immersion-press type reactor, helical conveyor, cradle-type reactor, rotary oven reactor.

c) Classification according to the movement condition of the solids presented in Table 1. The reactor of this invention tends towards the characteristics of a fluid bed, albeit movable, with the following values: reaction device (tank), movement of the solids (gravitational), gas/liquid-solid flow (counter current), particle diameter (mm to cm), time of retention of the solids (minutes), time of retention of the gas (seconds), rate of heat and mass transfer (high), temperature control (good), yield in terms of volume and time (high).

Other important characteristics of reactors are the materials used to manufacture them. Table 2 gives the basic materials with their respective advantages and disadvantages for high corrosion conditions. The structural materials and those resistant to corrosion, even when used in making reactors, each presents a single disadvantage, which this invention eliminates by making the reactor with a shell and structure made of carbon steel and a coating of special materials (refractory, superalloys, stainless steel and plastics, etc.).

Specifically, the main biomass reactors are of the following types: screw (low volume occupation percentage), tower (high L/S—liquid-solid ratio, tank/percolation (high L/S ratio and plug flow (high L/S ratio). All the types of reactor have complex biomass feed and discharge systems. This invention compacts biomass in the reactor (high rate of volume occupation of the reactor), processes the biomass with low L/S ratio=2, provides feed with a simple helical feeder and immediate discharge due to the fact that the reactor has a large cover and can be divided into small-size and medium-size reactors.

One disadvantage of the reactors of the prior art is that they are subject to implosion due to the fact that their construction does not permit a perfect juxtaposition between the shell and the coating, and there is a vacuum inside the reactor, caused, in most cases, by steam condensation. This invention prevents implosion through the vacuum maintained between the coating and the shell, so as to allow them to be properly juxtaposed.

Another disadvantage of the conventional reactors is the impossibility of continuously and precisely detecting microleakage in the coating. This invention permits the precise detection of microleakage before the occurrence of leakage of corrosive liquids into the steel shell of the reactor. This allows the reactor to be further used, even with microfailures, by adequately programming it for use.

The reactors used in high-corrosion applications do not utilize carbon steel in the shell and tend to be made of expensive monolithic materials. By enabling the identification of microleakages, this invention detects the conditions for accelerated corrosion of the microbonded carbon steel, and this detection facilitates the use thereof, which brings about a significant reduction in the costs of manufacturing the reactor.

The reactors of the prior art are built from thick materials, in order to achieve greater resistance to corrosion. Therefore, sometimes the thickness of the metal in the construction of the reactors has a direct relationship with the safety, and the utilization of very thick plates makes their transportation to areas where there is raw material for their use impossible. The reactor of this invention provides perfect control for detection of failures and allows lighter materials to be used, which reduces the total weight of the reactor and consequently facilitates its transportation.

U.S. Pat. No. 5,338,366 refers to a method and apparatus for pre-hydrolysis of biomass that, among other features that are different from this invention, is very heavy and so remains in a stationary position, which requires raw biomass to be transported to it. In addition, the pre-hydrolysis of biomass is made in various pieces of equipment, which increases the consumption of energy for carrying it out and renders the production process expensive. This invention, in addition to eliminating these drawbacks, facilitates a high concentration of sugar in the pre-hydrolysate, thus reducing the costs of the following processes, and enables one to use deionized water due to the low liquid/solid ratio for the production of clean catalytic cellulignin fuel for use in gas turbines.

U.S. Pat. No. 5,411,594 deals with the hydrolysis of lignocellulose biomass for the production of a single sugar solution and lignin residues. The whole hydrolysis is carried out in two stages (hemicellulose and cellulose) in a continuous reactor and has an L/S ratio of 5:10 with a maximum output of 65%, and, due to the high L/S ratio, there is a complex heat-recovery system. This invention implements the whole process, since it carries out the pre-hydrolysis of hemicellulose in a batch-type reactor with an L/S ratio=2 and has an output of 100% (maximum utilization of raw material): recovery of cellulignin 80% and pre-hydrolysate 20%. The recovery of heat takes place only when discharging the pre-hydrolysate, pre-heating the acidic solution and water in the boiler.

TABLE 1

Classification according to the state of movement of the solids

| | Fixed bed | | Fluid bed | | |
|---|---|---|---|---|---|
| Reactor Type | Upper flow | Permeable | Fluid Bed | Expanded Fluid Bed | Transport (Solid / Gas) |
| Typical reaction devices | Multiple cradle Rotary furnace Drying belt | Vertical furnace Movable grid Burning on grid Furnaces | Fluid roaster Fluid bed roaster Multi-stage Fluid bed Furnace | Circulating fluid bed | Flash drying Pre-heater Fusion cyclone Burner |
| Movement of solids Gas/solid flow | Mechanical Parallel stream Countercurrent Crossed current | Gravitational | Gravitational Mixed flow Countercurrent in stages Crossed current | | Gravitational Parallel currents Mixed flow: recycling Stages in countercurrent |
| Particle diameter | Small to very large (mm/m) | Medium to very large (cm/m) | Small and medium (mm/cm) | Very small to small (mm/mm) | Very small (mm) |
| Retention time of the solids | Hours–days | | Hours | Minutes | Seconds and fractions |
| Retention time of the gas | Seconds | | Seconds | | Fractions of seconds |
| Transfer rate of heat and mass | Very low | Low–medium | High | Very high | Very high |
| Temperature control | Very good | Poor–medium | Good | Very good | Medium–good |
| Output in volume and time | Very low Medium | Medium | Medium High | High | Very high |

TABLE 2

Basic Materials Used in the Manufacture of the Reactors

| | MATERIALS | ADVANTAGES | DISADVANTAGES |
|---|---|---|---|
| Structural materials | Mo(C—½Mo) carbon steel, Cr-(1¼Cr—½Mo, 2¼Cr—1Mo, 5 Cr—1Mo) steel, stainless (405, 410, 304, 316, 321, 347, 309, 310, steel resistant to heat (HH, HK, HP), monel, brass, bronze, aluminum, etc. | Low cost Availability Resistance to abrasion Ease of manufacture Mechanical resistance (strength) to medium temperature Recyclable Ductility | Low resistance to corrosion |
| Metals resistant to corrosion | Cr—Mo (9Cr—½Mo) steel, inconel, incoloy, hastelloy, duplex allows, Fe—Si, stainless ferritic, Ni(3½Ni, etc.) steels, lead, Cu—Ni (70/30, 90/10, etc.), refractory metals (Ti, Zr, Nb, Ta, W, Mo and their alloys) and proprietary alloys | Medium and high resistance to corrosion Availability Resistance to abrasion Ease of manufacture Mechanical resistance to high temperature Recyclable Ductility (except for Fe—Si). | High cost |
| Thermoplastic materials | Teflon (260° C.), chlorinated polyester (121° C.), polyvinylidene fluoride (121° C.), polyvinylidene chloride (93° C.), polypropylene PP (90° C.), polyethylene PE (93° C.), polyvinyl chloride - PVC (71° C.), chlorinated polyvinyl chloride and reinforced PVC (99° C.) | Low cost Availability Ease of manufacture High resistance to corrosion Recyclable Ductility | Low resistance to abrasion Low mechanical resistance (strength) |
| Elastomers | Natural rubber (66° C.), ebonite (82° C.), hypalon (93° C.), neoprene (93° C.), buthylic rubber (93° C.), hycar (121° C.), viton (204° C.). | Low cost Availability Ease of manufacture High resistance to corrosion Ductility | Low resistance to abrasion at medium temperature Low mechanical resistance (strength) Non-recyclable |
| Reinforced heat cured plastics | Glass fiber/polyester (93° C.), asbestos/epoxy (149° C.), glass fiber glass/epoxy (149° C.), asbestos/fenolic (149° C.), asbestos/furanic (149° C.), glass fiber/furanic (93° C.), carbon fiber/furanic (93° C.). | Availability High resistance to corrosion Ease of manufacture High mechanical resistance (strength) Ductility | High cost Low resistance to abrasion Non-recyclable |

TABLE 2-continued

Basic Materials Used in the Manufacture of the Reactors

| MATERIALS | | ADVANTAGES | DIS-ADVANTAGES |
|---|---|---|---|
| Special non-metallic materials | Cement or concrete, reinforced cement, antiacid refractories, graphite bricks, impermeable graphite, glasses and vitrification, wood and refractories | Low cost Availability High resistance to abrasion Ease of manufacture High resistance to corrosion Mechanical resistance to high temperature | Low mechanical resistance (strength) Fragility Non-recyclable |

SUMMARY OF THE INVENTION

This invention refers to an apparatus, more specifically a reactor or boiler, built with technology that enables use in highly corrosive environments. The new technology consists of inserting a vacuum between it outer coating, the "shell", and the inner coating, so as to utilize microbonded carbon steel in the shell and structure of the reactor, and special materials, especially refractory metals (Ti, Zr, Nb, Ta, and their alloys) for the inner coating. The vacuum with the coating of refractory material further permits the use of high-resistance (750 MPa) microbonded steel in the manufacture of the ultralight shell of the "egg-shell"-type reactor, enabling oscillation at higher frequencies with higher homogenization of the product and shorter reaction time thereof.

The satisfactory vacuum level is below 1 mm of Hg (1,000 $\mu$m), so that the refractory metal coating will not suffer implosion, and so that it is possible to use a helium leakage detector coupled between the reactor and the vacuum pump for detecting and measuring leakage through the microcracks of the welds. Leakage rates of $10^{-4}$ Ncm$^3$/min indicate a satisfactory level and leakage rates 100 times higher (10.2 Ncm$^3$/min) indicate the need for repair of the welding cracks or those developed during operation of the reactor. Another characteristic of the invention is the possibility of maintaining and maybe replacing the coating of refractory metal altogether, with high aggregated value for recovery of these scrapped metals due to the carbon steel reactor's juxtaposed manufacture, maintained by the vacuum and without welding to the shell.

The vacuum between the shell of the reactor and the coating maintains the thin coating of special metal juxtaposed to the steel shell, preventing the implosion of the reactor, even when there is vacuum inside it, due to the condensation of steam and other causes. The use of vacuum, among other advantages, also permits continuous or intermittent detection of microleakage in the coating of the reactor by injecting helium gas into the reactor and detecting with a leak detector) in the vacuum pump.

Due to this characteristic, this invention is called "failsafe-type reactor", by means of which one detects and measures microleakage in periods of days or months before the occurrence of leakage of corrosive liquids into the shell of the carbon steel. This characteristic enables one to use the reactor even with microfailures, and to program its repair or replacement after the industrial session or campaign has finished. One should note the significance of this characteristic of the invention for enabling one to use carbon steel in the reactor shell for high-corrosion applications, without which leakage and consequently accelerated corrosion of the microbonded carbon steel would not be identified.

The apparatus of this invention, in being lighter than those of the prior art, permits oscillation during its hydrolysis process, which allows the limit-layer of the sugar-saturated liquid to be renewed on the surface of the biomass chips or particulate, thus bringing about a homogeneous product. Pre-hydrolysis coupled with oscillation and purging of steam will provide the characteristic of catalytic combustion of the cellulignin.

OBJECTIVES OF THE INVENTION

One objective of the invention is to provide the use of carbon steel in processes carried out in highly corrosive mediums.

Another objective of this invention is to identify corrosion of carbon steel used in the reactor.

Another objective of this invention is to prevent implosion of the reactor, even when there is a vacuum inside it.

Another objective of this invention is to permit detection of leakage or even microleakage in reactors.

Another objective of this invention is to enable one to program periods of maintenance or repair of the reactor adequately.

Another objective of this invention it to reduce the weight of the reactor and to enable one to transport it to places where there are raw materials.

Another objective of this invention is to reduce the costs of manufacturing the reactor by virtue of the possibility of using cheaper materials.

Another objective of this invention is to enable one to use a more resistant steel as shell/outer coating, so as to permit oscillation at higher frequencies, in order to better homogenize the product and shorten its reaction time.

Another objective of this invention is to meet the requirements of Resolution CONAMA No. 20 of Jun. 18, 1986, published in the D.O.U. (Official Gazette) of Jul. 30, 1986, in washing waters, imparting to the invention totally ecological features.

DETAILED DESCRIPTION OF THE FIGURES AND OF THE CHARACTERISTICS OF THE INVENTION

Figure 1:
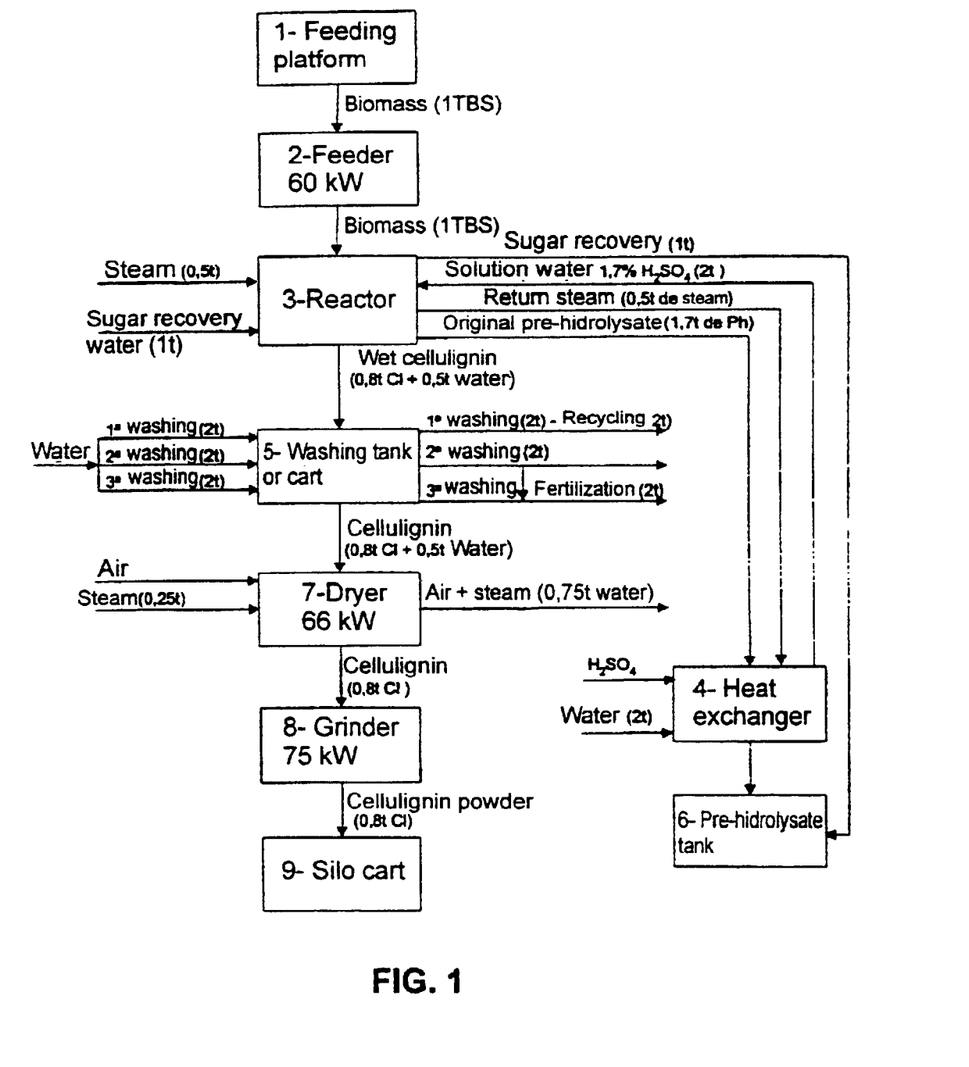
FIG. 1 shows a flowchart of the pre-hydrolysis of biomass with balance of mass.

The flowchart of biomass processing is shown in FIG. 1, where the "failsafe type reactor" of this invention is the main equipment. In the processing of minerals, the steps are similar, only there is adaptation of the peripheral pieces of equipment and adjustment of the mass balance for each type of mineral. The flowchart is composed of the following steps:

1) feeding platform—where the biomass (or mineral) is discharged and washing is carried out or not;
2) helical feeder—responsible for feeding and compacting biomass in the reactor (this compaction is dispensable in the case of minerals); 3) reactor—main object of the invention, where the processes of biomass hydrolysis, mineral digestion or any other chemical or thermochemical processes of any material are developed;
4) heat-exchanger—having three function, namely: a) recovery of the heat while discharging the pre-hydrolysate, b) pre-heating of the acidic solution, and c) pre-heating of the steam-generating water in the boiler;
5) tank or washing cart—where the cellulignin (or mineral) is washed to the desired extent, the pre-washing being recovered as pre-hydrolysate and the other washings being neutralized and treated in a stabilization pond prior to discharge into streams or for use in fertilization, etc.;
6) tank of pre-hydrolysate, either stationary or installed on carts—storing of the first product;
7) cellulignin or mineral dryer—drying of the second product;
8) cellulignin or mineral grinder—grinding of the second product;
9) silo, either stationary or installed on carts—storing of the second product.

The invention defines a new technology of manufacturing chemical reactors for processes in highly corrosive environments. FIG. 2 illustrates in detail a reactor built with the technology of this invention and, in addition, shows all the components of an ordinary reactor for better understanding.

The conditions of internal corrosion of the reactor for different materials, temperature and acid content are given in Table 3, whence the following conclusions are drawn:

1) due to its high corrosion rate, stainless steel can only be used at high temperatures for a very short period of time; 2) it is possible to use commercial grade Ti for the conditions of pre-hydrolysis of biomass (T=15° C., 1.5% H2SO4, 0.62 MPa), since this is a reactive material and passivates with sugar generated by the hydrolysis itself; 3) for the conditions of total hydrolysis of biomass (T=190° C., 1.5% H2SO4, 2.8 MPa) it is necessary to use NbTi alloys (example: Nb44% Ti) with a melting point T=1,830° C. permitting easier welding than pure Nb, which has a melting point of T=2,500° C.; 4) for the conditions of mineral digestion (T=150° C., 60% H2SO4, P=0.6 MPa), it is necessary to use Nb40% Ta alloy, the corrosion rate of which is in the order of 100 mm/year. Above 40% Ta, the alloys become expensive due to the need for using thantalite mineral instead of the columbite in the production of NbTa alloy.

TABLE 3

Corrosion Data for the Conditions of Pre-hydrolysis, Hydrolysis of Biomass and Mineral Digestion (mm/year)

| | Biomass | | | Mineral Digestion | | Cost of |
|---|---|---|---|---|---|---|
| | Pre-hydrolysis | Hydrolysis | | | | |
| T° C. | 100° C. | 150° C. | 190° C. | 143° C. | 197° C. | material |
| X% H₂SO₄ | 1% | 1.5% | 2% | 60% | 80% | US$/kg |
| SS 316 | 3,550 | ∞ | ∞ | ∞ | ∞ | 8 |
| Ti | 2,500 | 19,000 | ∞ | ∞ | ∞ | 50 |
| Hastelloy | 25 | — | 250 | >5,000 | ∞ | 40 |
| Nb | 0 | 4.5 | <25 | 574 | 31,761 | 50 |
| Nb 20% Ta | — | — | <1 | 367 | 19,243 | 50 |
| Nb 40% Ta | — | — | — | 67 | 4,093 | 50 |
| Nb 60% Ta | — | — | — | 22 | 916 | 3,200 |
| Nb 80% Ta | — | — | — | 3.4 | 275 | 410 |
| Ta | 0 | <1 | <1 | 0.1 | 111 | 500 |
| Ti 1% H₂SO₄ 7.2% Wood | | 100 | | | | |

The details of FIG. 2 present the method of welding the refractory metal coating in situ and juxtaposed to the shell of the carbon steel reactor, without the former becoming molten or contaminating the refractory metal. Protections rings or plates of the same metal as the coating are placed on the welding of the parts and edges. The welding is carried out with plasma with inert-gas protection (helium or argon), guaranteeing interstice levels (C, O, N, H) within the norms of the initial material. As to the metallurgical characteristics, there is a growth of grains in the welded zones, decreasing the strength, mainly the fatigue strength. This decrease is acceptable, since the coating works in compression regime, and there is an increase in the coating in regions under traction regime. The construction of the reactor having a bipartite structure with a slight conicity at the cylindrical parts allows much of the welding to be carried out outside the carbon steel shell and only the junctions of large parts and edges to be welded in situ. It is also possible to recover significant portions of the coating, in case it is necessary to replace it, by virtue of the ease of disassembling it, thus recovering part of its cost as scrap of high value. The special metals enable the use of other acids, in addition to H2SO4 (HCl, HNO3, etc.), provided that the effective pH is similar to the levels of the solutions of Table 3.

Another feature of this invention is the use of elastomer rings (voton, silicone, teflon, and others) having a circular or trapezoidal cross-section on all the covers, connections and vacuum sealing in the coating. The sizing of the sealing rings follow standards of pressure and vacuum sealing. The type of ring is chosen in function of the temperature. When processing minerals or biomass, the temperature usually is around 200° C., and the ring chosen is made of viton. On the other hand, for average temperatures, the ring should be of teflon/glass fiber/carbon fiber, the metallic one being most recommended for high temperatures.

In addition to biomass and minerals, it is possible to process any type of material in the "failsafe type reactor" (polymerization, foodstuffs, medicaments, synthesis of products, etc.), provided that the conditions of corrosion of the coating are respected. In highly aggressive conditions, one uses Ta, either pure or doped with platinum, which are insuperable materials compared with any other commercial material. For less aggressive conditions, the "failsafe" technique permits the use of lower quality noble coatings, mentioned in Table 2 (stainless materials, nickel alloys, thermoplastics, elastomers, reinforced thermocured plastic, etc.), provided that the conditions of temperature, pressure, corrosion, abrasion, and strength of the material are respected.

The external conditions of corrosion of carbon steel are more aggressive at the moment of discharge of the products (cellulignin, minerals, etc.). Steams were condensed at the moment of discharge, their pH was measured, and various steels painted with bituminous epoxy paint were tested.

Table 4 gives the comparison of the costs/m$^2$ of the reactors coated with Ti, Nb and monolithic made of stainless steel and hastelloy. In addition to the technical superiority, they have lower costs than the monolithic reactors.

TABLE 4 cost of the materials used in the construction of the reactor/m$^2$

| Coating Type | Material | Total Weight | Price/kg | Total Price | Final Price R$/m$^2$ |
|---|---|---|---|---|---|
| Titanium | Steel plate 12 mm | 91 kg | R$ 1.00 | R$ 91.00 | R$ 379.00 |
|  | Ti plate 2 mm | 9 kg | R$ 32.00 | R$ 288.00 |  |
| Niobium | 12 mm steel plate | 91 kg | R$ 1.00 | R$ 91.00 | R$ 1,211.00 |
|  | Nb plate 2 mm | 16 kg | R$ 70.00 | R$ 1,120.00 |  |
| Stainless steel | 12 mm plate | 91 kg | R$ 16.00 | R$ 1,456.00 | R$ 1,456.00 |
| Hastelloy | 12 mm plate | 91 kg | R$ 32.00 | R$ 2,912.00 | R$ 2,912.00 |

The main characteristics of this invention are shown in FIG. 2, and Table 5 gives the caption of the parts and components of the reactor and of the feeder.

The reactor body is composed of the cylindrical portion 1.1, cap 1.2, inlet nozzle 1.3, inlet cover 1.4, conical sector 1.5, circular or radial sliding ring with wedges or pins 1.6, discharge cover with support of the wedge 1.7, valve connections, meters, accessories, etc. 1.8, hinge 1.9, articulation and hydraulic cylinder for closing the cover 1.10, hydraulic cylinder for closing and opening the wedges 1.11. The bipartition of the reactor is illustrated in detail A, which enables the assembly and disassembly of the special metal coating without welding or unwelding the steel shell of the reactor. For small reactors, the cover is displaced for bi-partition, the conical sector being eliminated (for very small reactors, the shell and the coating may be juxtaposed only by fitting, without the need for welding). The cylindrical body is slightly conical to facilitate the assembly and disassembly of the coating. The latter is welded, in great part, prior to the assembly, the parts shown in details A—F remaining to be welded within the reactor shell. This technology is fundamental to make possible the welding dose to the steel body of the reactor (melting point of 1760°) of the special metals having a high melting point (1800° C.–3100° C.), preventing the contamination thereof with Fe. The opening and dosing of the cover is done by means of two hydraulic systems, the first one commanding the internal-pressure support wedges of the reactor, maintaining the confinement pressure of the sealing ring (o-ring) of viton of the acidic solutions. This sealing ring supports for months or years the repetitive opening and closing during the operations.

Figure 2A:
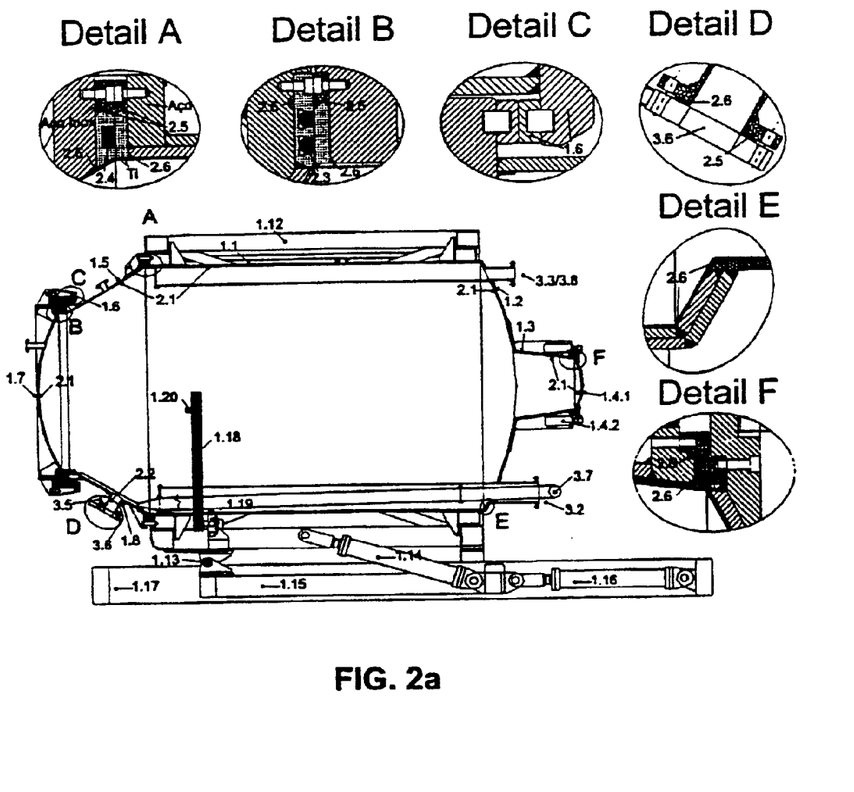
FIG. 2a shows an embodiment of the reactor in cross-section and its manufacture details.
Figure 2B:
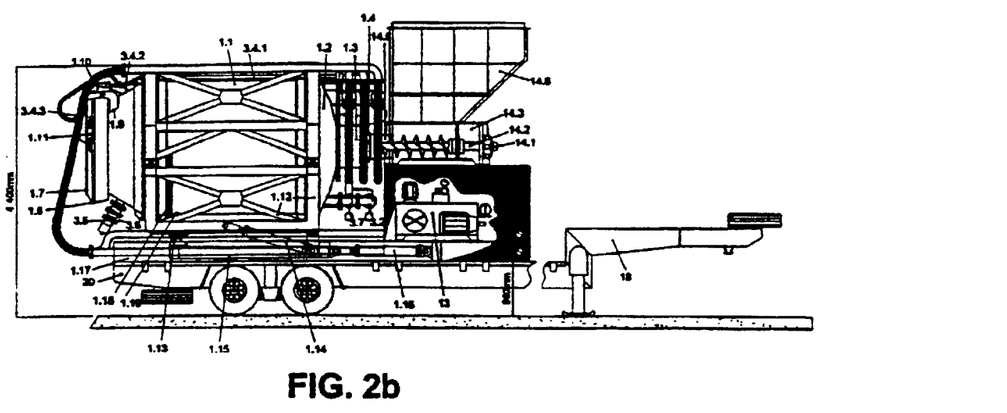
FIG. 2b is a side view showing the placing of an embodiment of the reactor on a transporting cart.
Figure 2C:
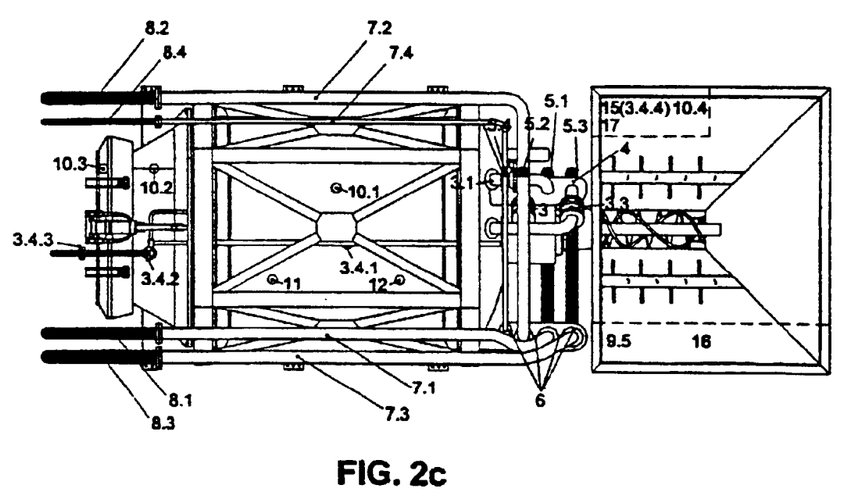
FIG. 2c is a top view of an embodiment of the reactor with a feeder.
Figure 2D:
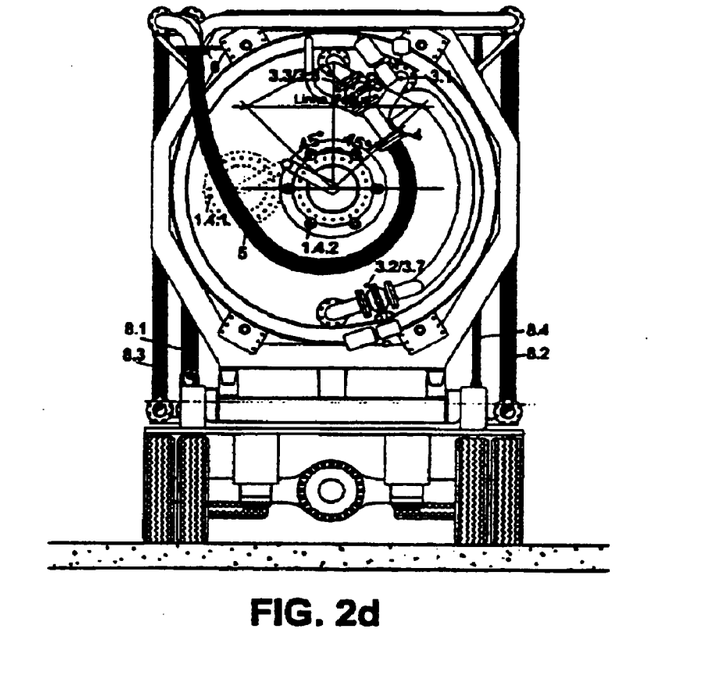
FIG. 2d is a rear view of an embodiment of the reactor on the transporting cart.

The tilting system is composed of structure 1.12, pivot 1.13, and hydraulic cylinder 1.14. The latter is utilized to tip and shake the reactor during the operation of discharging the cellulignin, since it is a solid material. The horizontal motion system is composed of a cart 1.15 and a hydraulic cylinder 1.16. Alternately, the reactor may be fixed and the feeder may be horizontally moved. The fixed structure 1.17 supports the reactor and the feeder, and thereby the reactor can be detached from the cart to the support pillars (see FIG. 2.d). The turning oscillation system is composed of chain 1.18 and a hydraulic motor 1.19 commanded by micro-switches 1.20, which revert the rotation at predetermined angles. The security of the turning oscillation system is given by the length of the chain, which escapes from gear of the hydraulic motor if the micro-switches fail.

The special metal coating 2.1 and 2.2 is made according to the details A —F. The main stresses on the coating occur on the inlet nozzle at the moment of loading of the reactor and on the cylindrical body, due to the movement of the turning oscillation system. The stresses are low, and the life time of the coating longer than ten years is determined by the fatigue failure. The sealings are made with an elastomer ring on the discharge cover 2.3, in the bipartition 2.4, between the coating and the reactor shell 2.5. The protection against the melting of the steel and the contamination of the refractory metal weld with Fe is done with sacrifice rings of refractory metal 2.6.

The connections and valves of the reactor are intended for the entrance of water and acidic solution 3.1, entrance of steam 3.2, exit of steam 3.3, vacuum in the reactor body 3.4.1, in the conic sector 3.4.2, in the cover 3.4.3, discharge of the hydrolysate 3.5, valve for collecting pre-hydrolysate for analysis 3.6. The entrance of vapors is at the lower portion and they are distributed by a perforated tube. The entrance of liquid (water or acidic solution) is at the upper portion. Obviously, inlets for liquids and vapors do not present any problem of clogging. The steam outlet is at the upper portion through a perforated pipe, and the hydrolysate discharge is located at the lower portion at the conic sector, which is protected by perforated plate inside the reactor to avoid clogging. A sporadic steam return is foreseen on the plate and perforated tube for unclogging the steam outlet through a by-pass valve between the steam inlet and outlet, after the flexible tube for entrance of steam 3.7 and 3.8. Alternatively, one may use a rotary scraper for the perforated plates. The connections and valves are connected to the inlet supports of the flexible rotation tubes 4 by rigid pipes.

The flexible rotation tubes 5 are constituted by various units: water and acidic solution inlet 5.1, steam inlet 5.2, steam outlet 5.3, vacuum 5.4 and others. The maximum rotation permitted is a =±45° C., so that no liquid will flow through the steam outlet. The level of the acidic solution is maintained below the water line (FIG. 2.d), so that no liquid will flow out. In case the steam outlet is below the liquid line, one resorts to electric commands of the steam outlet valve 3.3 for closing it, whenever the liquid limit line is exceeded. In general, these electric commands are unnecessary because the oscillating turn of 45° is sufficient to wet the whole biomass, homogenize the liquid and solid mass, and avoid preferred ways in the hydrolysis. The supports of the outlets of the flexible rotation tubes 6 are placed at the upper portion of the reactor.

The intermediate piping 7 are constituted by the same components of the flexible rotation tubes 7.1–7.4 and interconnect the outlets of the flexible rotation tubes to the inlets of the flexible tilting tubes.

The flexible tilting tubes 8 are constituted by the same components as the intermediate piping 8.1–8.4 and are designed for enabling one to tilt the reactor with its support structure for discharging of the cellulignin. The outlet of the flexible tilting tubes are connected to the fixed piping 9.1–9.4. The latter connect the flexible tilting tubes to the set of valve pipes 9.5 installed on the control panel located beneath the feeder 16.

The vacuum sensors 10 are constituted by four units: reactor body 10.1, conic sector 10.2, reactor cover 10.3, and the piping of the vacuum pump 10.4. The closing of the pertinent valves and the viewing of the vacuum drop enable one to determine a possible leakage in the special metal coating.

The pressure gauge 11 is of the diaphragm type, in order to resist acidic mediums, and the temperature gauge 12 is protected by a protection shaft of the same material as the coating.

The hydraulic system 13 drives the following units in this order hydraulic motor of the helical feeder 14.1, motion hydraulic cylinder 1.16, hydraulic cylinder of the closing cover 1.10, hydraulic motor of the oscillating rotary system 1.19, hydraulic tilting cylinder 1.14, hydraulic cylinders for opening the wedges 1.11. Please note that there is no simultaneity of any operation, the higher power prevailing, which is that of the hydraulic motor of the helical feeder 14.1.

The feeder is composed of a hydraulic motor 14.1, a semi-axle of the propeller 14.2, feeder propeller 14.3, feeder cradle 14.4, a conical feeder nozzle 14.5, and a coif 14.6. The feeder should fill the reactor in a period of 10 minutes. It is built of microbonded carbon steel, protected with bituminous epoxy paint. The space below the feeder is occupied by the control panel 16 (liquids, steams, meters, electric system, etc.), a hydraulic system 13, a vacuum pump 15, a leakage detector 17, work tools and working devices, etc.

Figure 2E:
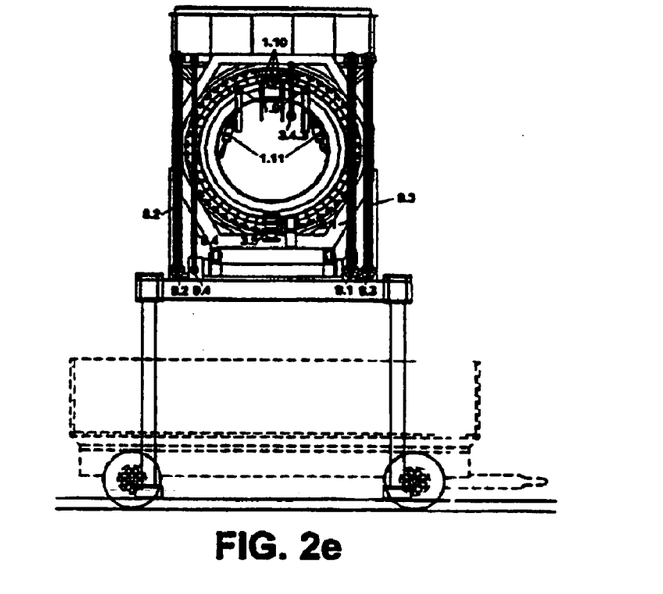
FIG. 2e is a front view of an embodiment of the reactor positioned on pillars in the biomass store with the cellulignin-unloading cart

The fixed structure of the reactor and the feeder accommodate in a standard cart with a platform located at 960 mm from the ground 18, maximum height of the lower equipment at 4.400 mm and within the road standards. The equipment is transported to biomass courts, where it is raised with hydraulic jacks and supported on beams and pillars at the desired processing height (FIG. 2.e). Alternatively, it can be operated on the transport cart itself.

The complementary pieces of equipment of the reactor are: heat exchanger 19, water pressure pump 20.1 and acidic solution discharge 20.2, water deionizer 21, boiler 22, and support structure 23. The latter is transported on standard carts 18, elevated and supported in the same way as the explained before.

TABLE 5

Key of the Reactor and Feeder Parts

A - 1st Structure (1st cart)

| | |
|---|---|
| 1 | reactor shell and structure |
| 1.1 | cylindrical body |
| 1.2 | cap |
| 1.3 | inlet nozzle |
| 1.4 | inlet cover |
| 1.4.1 | cover |
| 1.4.2 | hydraulic cylinders |
| 1.5 | conical sector |
| 1.6 | sliding ring with wedges |
| 1.7 | discharge cover with support for the wedges |
| 1.8 | connections |
| 1.9 | hinge |
| 1.10 | articulation and hydraulic cylinder cover opener |
| 1.11 | hydraulic cylinder for closing/opening of wedges |
| 1.12 | tilting structure |
| 1.13 | tilting pivot |
| 1.14 | tilting hydraulic cylinder |
| 1.15 | movement cart |

TABLE 5-continued

Key of the Reactor and Feeder Parts

| | |
|---|---|
| 1.16 | horizontal movement hydraulic cylinder |
| 1.17 | reactor and feeder fixed structure |
| 1.18 | chain of the oscillating rotary system |
| 1.19 | hydraulic motor of the oscillating rotary system |
| 1.20 | micro switches |
| 2 | coating in metals and special alloys |
| 2.1 | body of the reactor |
| 2.2 | flanges |
| 2.3 | sealing ring of discharge cover (o-ring) |
| 2.4 | sealing ring of bipartition (o-ring) |
| 2.5 | vacuum sealing ring between shell and coating |
| 2.6 | Ti ring for protection against Fe contamination in the Ti weld |
| 3 | connections and valves of water, acidic solution, steam, vacuum, and pre-hydrolysate |
| 3.1 | inlet for water and acidic solution |
| 3.2 | inlet for steam |
| 3.3 | outlet for steam |
| 3.4 | vacuum |
| 3.4.1 | vacuum in the reactor body |
| 3.4.2 | vacuum in the conical sector |
| 3.4.3 | vacuum in the reactor cover |
| 3.4.4 | vacuum in the vacuum pump |
| 3.5 | discharge of pre-hydrolysate |
| 3.6 | valve for collection of pre-hydrolysate for analysis |
| 3.7 | steam return valve in the perforated plate of the pre-hydrolysate discharge pipe |
| 3.8 | steam return valve in the perforated tube of the steam outlet |
| 4 | entry support of the flexible rotation tubes |
| 5 | flexible rotation tubes |
| 5.1 | water and acidic solution inlet |
| 5.2 | steam inlet |
| 5.3 | steam outlet |
| 5.4 | vacuum |
| 6 | support for outlet of flexible tubes |
| 7 | intermediate piping |
| 7.1 | water and acidic solution inlet |
| 7.2 | steam inlet |
| 7.3 | steam inlet |
| 7.4 | vacuum |
| 8 | flexible tilting tubes |
| 8.1 | steam and acidic solution inlet |
| 8.2 | steam inlet |
| 8.3 | steam outlet |
| 8.4 | vacuum |
| 9 | piping and valves for water, acidic solution, steam and vacuum |
| 9.1 | water and acidic solution inlet |
| 9.2 | steam inlet |
| 9.3 | steam outlet |
| 9.4 | vacuum |
| 9.5 | valve piping assembly |
| 10 | sensors |
| 10.1 | in the body of the reactor |
| 10.2 | in the conical sector |
| 10.3 | in the reactor cover |
| 10.4 | in the vacuum pump |
| 11 | pressure gauge |
| 12 | temperature gauge |
| 13 | hydraulic systems |
| 14 | feeder |
| 14.1 | hydraulic motor |
| 14.2 | propellor half-shaft |
| 14.3 | feeder propellor |
| 14.4 | cradle of the feeder |
| 14.5 | conical feeder nozzle |
| 14.6 | cap |
| 15 | vacuum pump |
| 16 | control panel (liquids, vapors, meters, electric systems, etc.) |
| 17 | leakage detector |
| 18 | Cart - Capacity 30 t |

B - 2nd Structure (2nd cart - figures not included)

| | |
|---|---|
| 19 | heat exchanger |
| 20 | pressure pump (20.1) for water and acidic solution (20.2) |
| 21 | water deionizer |
| 22 | boiler |
| 23 | support structure for items 19 to 22 |

Processing of Pre-Hydrolysis of Biomass and
Resulting Products

The pre-hydrolysis may be carried out in any type of biomass, such as wood, and sugar-cane bagasse and straw, vegetable residues, barks, grass, organic part of garbage, etc. The pre-hydrolysis process follows these steps:

1—The biomass in minced form is discharged on the feeding platform, which may be constituted by a conveyer or inclined helical feeder, where it is washed in order to diminish the inorganic content (earth, ashes, etc.).

2—The feeding platform unloads the biomass into the helical feeder, which fills the reactor until the beginning of the compacting, reaching the density of 300 kg/m3 (dry matter), which is three times the density of soft biomass (bagasse, straws, grass, vegetable residues, barks, organic part of garbage). The feeder remains coupled to the reactor during the filling operation, which lasts about 10 minutes. After the reactor has been filled, it is uncoupled from the feeder by a horizontal movement of the movable structure with respect to the fixed structure. After the uncoupling, the inlet nozzle is closed by a valve commanded by hydraulic cylinders.

3—After the reactor has been filled, the degasifying operation begins by passing steam, flooding the reactor with a acidic solution (on the order of 1.7% of the biomass), pre-heated up to 80° C. in the heat exchanger and in the liquid/solid ratio—L/S=2, heating and pressurizing up to 160° C., 0.62 MPa. This activity has a duration of 10 minutes, and the heat of the escape steam is recovered in the heat exchanger by the acidic solution of the next reaction. In order to carry out this recovery of heat, the heat exchanger is usually sized with twice the volume of acidic solution required for each reaction.

4—After heating and pressurizing, the pre-hydrolysis is carried out for a period of 30 minutes simultaneously with the rotary oscillation of the reactor and purge of steam, in order to maintain the temperature close to 160° C. ±10° C., which is fundamental to obtain the characteristic of catalytic combustion of cellulignin, since the lower temperatures do not hydrolyze completely the memicellulose and amorphous cellulose, and higher temperatures cause the transformation of crystalline cellulose into amorphous cellulose, thus making it difficult to grind it into fine particles (f<250 mm). It should be noticed the importance of the flexible connections to maintain the temperature during the whole period of hydrolysis and the oscillation of the reactor to renew the limit layer of the liquid saturated with sugar on the surface of the chops or particles of biomass, optimizing the hydrolysis period by about 20–30 minutes. The control of the pre-hydrolysis is made by accompanying the sugar content in the pre-hydrolysate by means of the refractometer or any other sugar-measuring apparatus up to the value of 9 Bricks. Longer periods of pre-hydrolysis result in a drop of the sugar content due to the decomposition of the xylose into furfural and furfurylic alcohol. The complete control of temperature, pressure, acid content, oscillation (homogenization) and purity of steam permits complete optimization of the pre-hydrolysis process.

5—After the pre-hydrolysis the operation of discharging the pre-hydrolysate (sugar solution) begins, which is directed to the stationary tank or tank-cart through the heat exchanger, thus recovering its energy in the pre-heating of the acidic solution and in the boiler water. The recovery of the heat of the pre-hydrolysate from the escape steam (heating and purge), and the use of low liquid/solid ratio (L/S=2) allows one to reduce the consumption of energy of this invention to values lower than 6% of the energy contained in the original biomass. These values are significantly lower than in any other biomass processing, which in most cases are on the order of 30% (L/S=12 ratio). The operation of discharge of the hydrolysate lasts about 10 minutes.

6—After the discharge of the pre-hydrolysate, the sugar-recovering washing is carried out in the proportion L/S=1, aiming at a Brick$\geq$5. This second fraction of the pre-hydrolysate may or may not be mixed in the first fraction (Brick$\geq$9). In general, the first fraction should be intended for the production of furfural (highest possible concentration of sugar), and the second fraction for the production of alcohol (for example, by fermentation with engineered *echerichia coli*). Note that the second fraction contains (5×1S)/(9×1.5S+5×1S)=0.27=27% of the sugar contained in the two fractions and cannot be lost. Further, it should be noticed that the two fractions totalize (0.09×1.5S+0.05×1S)/0.2S=0.925 S=92.5% of the sugar contained in the hemicellulose and amorphous cellulose. Due to the high recovery rate, there is no need for complex and expensive utilization of the sugars from the washing water, that is discarded. This invention dispenses the use of expensive screw presses for extracting the pre-hydrolysate and recovering sugars. The sugar-recovery period is on the order of 10 minutes.

7—After the recovery of sugar, the discharge of the cellulignin is effected by opening the large cover and tilting the reactor. The cellulignin may be discharged in mechanical washers (conical, cylindrical, rotary tanks, etc.) or on carts to be washed by percolation (diffusion). The discharge is made in a few minutes and, together with the cleaning of the sealing rings and the recovery of the reactor in a discharging position, it takes less than 10 minutes. The complete cycle lasts about 80 minutes, permitting 16 reactions per day, with a rate of utilization of the machine of 90%.

8—The washing operations may be carried out in any type of washer. Preference is given to washing by percolation (diffusion) on carts or big-bags that present lower consumption of water, maintains the cellulignin protected from impurities and permits unloading on bulk carts. The washing waters meet the requirements of Resolution CONAMA No. 20 of Jun. 18, 1986 (published in the D.O.U of Jul. 30, 1996 (Brazilian Official Gazette) and, in principle, they could be discarded in any water vein. With a view to imparting totally ecological characteristics to the invention, the washing waters are neutralized with lime milk and biologically treated with sterilization ponds.

9—There are two washing options in this invention, namely with normal water and with deionized water. With the first water one obtains normal cellulignin with normal ash content resulting from the inorganic materials present in the biomass and impurities from the environment (mainly earth). The washing with deionized water aims at obtaining clean cellulignin to be used as fuel for gas turbines, the greatest requirement of which is the low content of K+Na<5 ppm. The pre-hydrolysis process is a highly efficient process for reducing biomass ashes, where the inorganic materials react with the $H_2SO_4$, resulting in soluble sulfates that are leached from the cellulignin in the pre-hydrolysis and in the washing processes. The use of deionized water increases the washing efficiency significantly, enabling the reduction of Na+K content down to the levels required in gas turbines. The use of deionized water in this invention is feasible and inexpensive, in view of the low L/S=2 ratio. In the conventional processes with a high consumption of water (L/S=12) one has never considered the use of deionized water and, consequently, the use of cellulignin as a fuel for gas turbines.

The biomass pre-hydrolysis process executed by the Failsafe-Type reactor generates two products (two commodities): cellulignin and pre-hydrolysate.

Cellulignin

Figure 3:
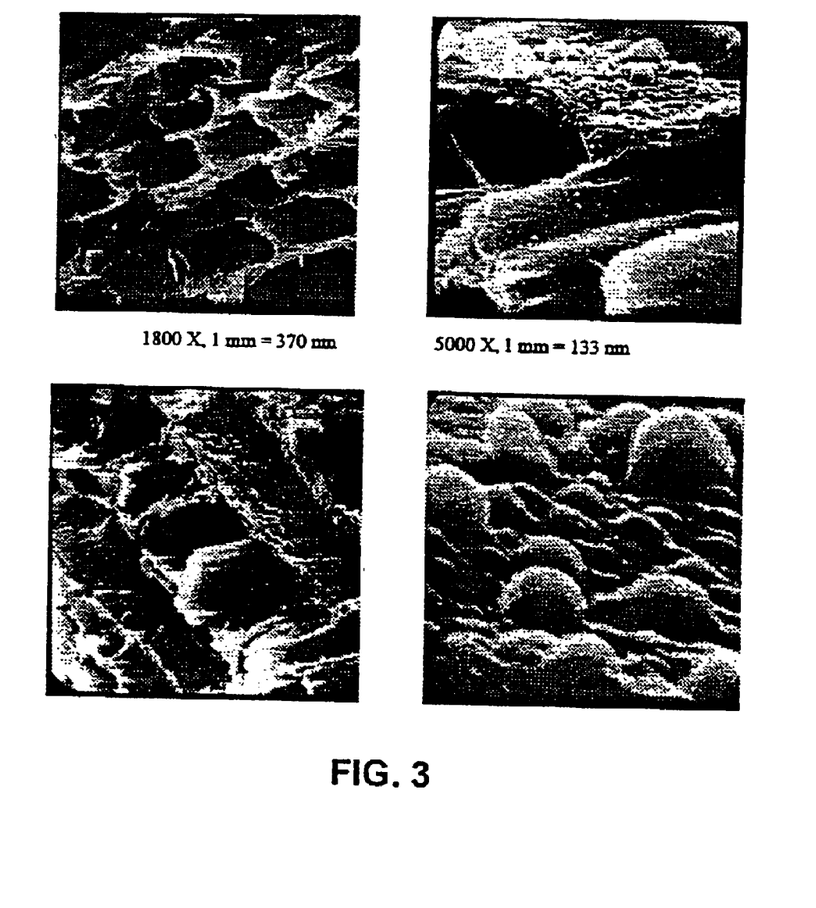
FIG. 3 shows microphotos of cellulignin (pre-hydrolyzed eucalyptus), crystalline cellulose and globulized lignin.

As regards cellulignin, it should be noted that wood is composed of hemicellulose, cellulose and lignin disposed in microfibrillae. The objective of the pre-hydrolysis executed in the Failsafe-Type reactor is to digest the hemicellulose and amorphous cellulose, leaving the cellulose intact in its crystalline form and the lignin in the globulized form. All these features have been achieved and shown in the microphotograph of FIG. 3. This microphotograph shows the fractal of the fibers of crystalline cellulose with the globulized cellulignin, where the empty spaces were occupied by the hemicellulose and amorphous cellulose prior to the pre-hydrolysis.

This result has the following characteristics:

a) due to the complete control of the process parameters of the Failsafe-Type reactor, the characteristics are uniform throughout the mass of the reactor, enabling the production of "homogeneous commodities."

b) Due to the maintenance of the crystallinity, it is possible to grind the cellulignin into particles smaller than 250 mm in hammer grinders, pin grinders and the like, with a consumption of energy of 12 kWh/t, which applied to Bond's formula: W=10 Wi/=10Wi/ whence W=work in kWht/t, Wi=rate of work of the material, P=mesh size through which 80% of the product (in microns) passes, F=mesh size through which 80% of the feed material passes (in microns) results in Wi=15, which is the same order of most mineral materials (that is to say, crystallines). The cost of the grinding energy is lower than US$ 1.00/t.

c) Due to the high porosity, the cellulignin undergoes a dry by natural gravity to content of 50% of moisture, dispensing with expensive screws presses for this processing step. The final drying is made in rotary dryers, achieving moisture lower than 12% with the same consumption of energy of the drying of cereals (750 MJ/t), illustrated by the examples below:

c.1) drying of cellulignin: consumption of 0.4 kg/h of GLP (42 MJ/kg of calorific power) during 10 hours to dry 224 kg of cellulignin—(0.4×10×42)10.224=750 MJ/t cellulignin);

c.2) drying of rice: consumption of ⅓ stere (cubic meter) of wood (396 kg/stere, 10.5 MJ/kg of calorific power) to dry 30 sacks of rice a day, 60 kg/sack)—(0.33×396× 10.5)1.8≅760 MJ/t rice.

Figure 4:
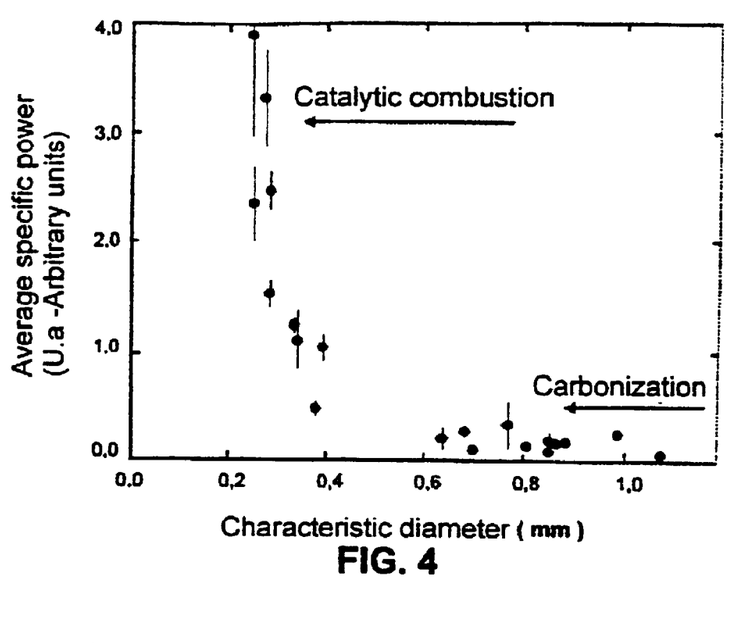
FIG. 4 is a graph showing the average specific power irradiated during the combustion of a cellulignin particle.
Figure 5:
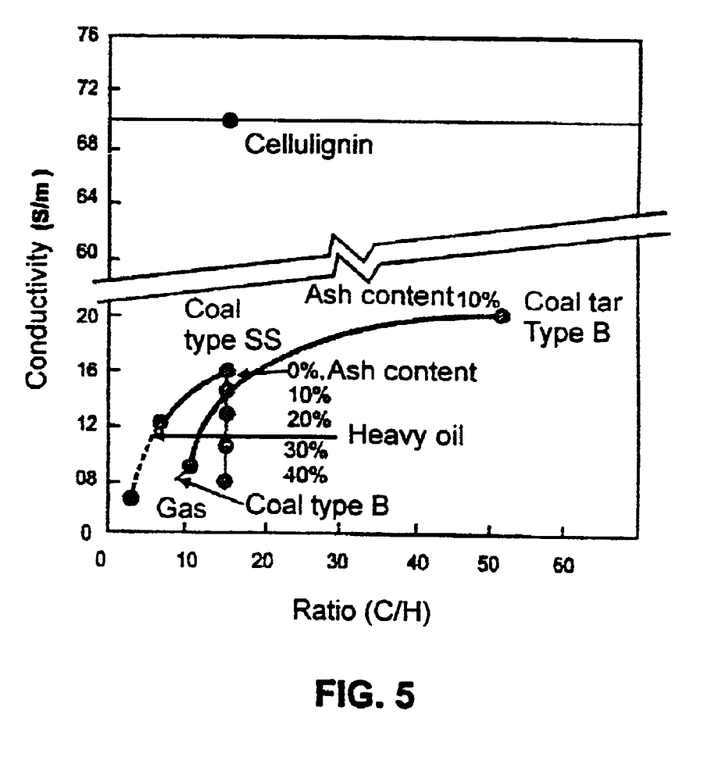
FIG. 5 is a graph showing the electrical conductivity of the combustion plasma for gas, heavy oil, coal, tar, and cellulignin.

The cost of drying using noble fuels (wood—US $10.00/ stere—US$1.80/t of cellulignin or GLP–US $ 0.50/kg–US$ 9.00/t of cellulignin) is always very expensive, and so one should use residual heat at 125° C. of the boilers. As a result, the drying and grinding should always be made close to the thermoelectric station or boiler, using residual heat;

d) Due to the globulization of lignin, empty spaces are opened for attack of the cellulose by microorganisms of ruminant animals, and the cellulignin may be used as a volume component of animal forage with digestibility of 58% comparable to high quality volume components (wet maize silage —61%, alfalfa silage —56%, grass forage —56%, oat straw 44%, and much higher than the digestibility of natural grass (35%).

e) The greatest application of cellulignin is as fuel for boiler, gas turbine and generation of power by magnetohydrodynamics (MHD). Table 6 gives an example of application of cellulignin as fuel for boiler, as compared with fuel oil. The lower calorific power of cellulignin (20 MJ/kg), compared with that of the fuel oil (41 MJ/kg), is counterbalanced by its cost (US$40.00/t), which is 113 lower than that of oil (US$120.00/t). Although twice as much cellulignin is required, it is possible for one merely to replace the fuel oil in any type of boiler, since it is an oxygenated fuel (29% of O2) and requires insulation of air with volumes close to that of the fuel oil. This means that any oil or gas boiler is capable of burning cellulignin, generating the same thermal power with adjusts on the order of 15% of the burners and air insufflators. The cellulignin produced with deionized water meets the requirements of clean fuel for burning in gas turbines with content of Na+K<5 ppm. Although the clean cellulignin contains values <15 ppm, these values are reduced by the cleaning cyclone. For particles smaller than 200 mm, the burning thereof is of the catalytic type, as shown in FIG. 4. This characteristic results from two factors, the first one being due to the large exposed surface (2 $m^2$/g measured by BET—Brunaur, Emmett and Tellen or the number of iodine 100), compared to the surface of natural biomass (0.4 $m^2$ $\mu$g), and the second one being due to its grinding into fine particles (f<250 mm), bringing about the entry of carburant oxygen and the exit of the monoxide in the pores of the cellulignin, without collision between the molecules, giving way to the catalytic combustion (size of cellulignin particle<average free way of the carburant and gases from the combustion). All indicates that cellulignin is the only solid catalytic fuel that can be produced on a large scale, its period of combustion (<20 milliseconds) being on the same order as that of natural gas. Gas turbines also require total particulate content <200 ppm and particulates bigger than 5 mm<8 ppm. These characteristics are achieved by means of three techniques: complete combustion due to the catalytic characteristic of cellulignin, cyclone installed between the external combustor and the gas turbine and magnetic separator after the grinding of the cellulignin to remove the magnetic contamination originated from the grinders. Without magnetic separators, one reaches values <50 ppm of total particulates and using magnetic separation one reaches the requirement of 8 ppm<5 mm. Due to the catalytic combustion, cellulignin is an excellent fuel for MHD, achieving high electric conductivity in the plasma of combustion at high temperature of 2727° C. (3.000 K). FIG. 5 shows the electric conductivity on the order of 70 S/m, compared with the values of 15 S/m for purified mineral coal, 12 S/m for oil derived from petroleum and 8 S/m for natural gas. It should be noted that wood has carbon content of 48% and hydrogen content of 6%, giving a ratio of C/H=8. The pre-hydrolysis raises the carbon content in cellulignin to 66% and lowers the H content to 4.3%, doubling the ratio C/H=15.

TABLE 6

Comparison of Oil and Cellulignin Burning in a Conventional Boiler

Project Data

| | |
|---|---|
| Projected pressure | 7.4 Mpa |
| Maximum continuous steam flow - Gauge | 67,000 kg/h |
| Maximum steam pressure - Gauge | 6.5 Mpa |
| Steam temperature | 485° C. |
| Feed water temperature | 180° C. |
| Exhaust system | Balanced |

Fuel Data

| | Oil | Cellulignin | |
|---|---|---|---|
| Composition (% by weight) | (APF-Al) | Normal[a] | Clean[b] |
| Carbon | 87.04 | 66.20 | 66.30 |
| Hydrogen | 11.12 | 4.30 | 4.30 |
| Sulphur | 0.04 | 0.10 | <0.01 |
| Nitrogen | 0.30 | — | — |
| Oxygen | 1.50 | 29.30 | 29.40 |
| Ashes | — | 0.10 | <15 (Na + K)[c] |
| Higher calorific power | 43.7 | 20.7 | 20.7 |
| Lower calorific power | 41.2 | 19.8 | 19.8 |

Fuel Data

| Fuel | Oil | Cellulignin[d] |
|---|---|---|
| Maximum continuous evaporation rate (kg/h) | 67,000 | 60,300 |
| Steam pressure gauge (Mpa) | 6.5 | 6.5 |
| Steam temperature (° C.) | 485 | 485 |
| Feed water temperature (° C.) | 180 | 180 |
| Gas temperature at the pre-heater outlet (° C.) | 180 | 200 |
| Room temperature of the air (° C.) | 25 | 25 |
| Main fuel flow (kg/h) | 4,687 | 8,770 |
| Auxiliary fuel flow of (kg/h) | — | 186[e] |
| Air flow (kg/h) | 73,800 | 84,710 |
| Gas flow (kg/h) | 84,040 | 100,000 |
| Excess air in the combustion (%) | 20 | 13/30[f] |
| Efficiency (Base PCI) (%) | 90.7 | 86.5 |

[a]Produced with non-deionized water;
[b]Produced with deionized water;
[c]Values in ppm.
[d]Normal;
[e]Natural gas or diesel oil;
[f]13% for cellulignin, 30% for the support

TABLE 7 main inorganic impurities of the eucalyptus and pre-hydrolisate

| mg/g | Ca | K | Na | Mg | P | Al | Si | Mn | Fe | Zn | S |
|---|---|---|---|---|---|---|---|---|---|---|---|
| Eucalyptus | 700 | 250 | — | 150 | 100 | 50 | 30 | 10 | 8 | 3 | 70 |
| Clean cellulignin | 1 | 15 | — | 80 | 2 | 40 | 100 | 2 | 8 | — | 80 |
| Pre-hydrolysate | 280 | 420 | 80 | 160 | 90 | 15 | 30 | 25 | 40 | 5 | 2,500 |

This result is highly significant, since FIG. 5 shows that the electric conductivity is very low for low values of C/H, and increases significantly up to C/H=15, saturating from now onwards. During the combustion, the hydrogen forms the hydroxyl OH; which has a shock section of 400 Å for the electron in the combustion plasma, decreasing its electric conductivity and failing to influence its value to content lower than 3% of H.

f) In addition to the applications as fuel and volume component for animal forage, cellulignin has various applications in the following areas: pyrolysis for the production of oils and activated coal, production of carbon black (incomplete combustion), production of methanol, cellulignin resinates (agglomerates, MDF—Medium Density Fiber), substrate for semi-solid fermentation (fungi, bacteria and enzymes), etc.

Pre-Hydrolysate

The pre-hydrolysate is a solution of sugars containing xylose (80%), glucose, mamose, galactose, arabinose, acetylics, uranic acids, etc. In addition to the sugars, it contains sulfuric acid added in the pre-hydrolysis process and inorganic impurities given in Table 7. The high control of process of the Failsafe-Type reactor allows one to carry out a virtually perfect pre-hydrolysis, permitting the digestion of all the products that are easily hydrolyzable, while preventing the decomposition of the sugars due to the low temperature of the process (160° C.). The content of soluble sugars (Bricks) is follow minute by minute, and the process is discontinued (beginning of the discharge, depressurization, cooling) as soon as the Bricks passes by a maximum. The low L/S ratio=2 allows one to achieve sugars content on the order of 10 Bricks similar to other broths (cane, maize, etc.). The pre-hydrolysate in general has pH=1. The recovery of sugars (type of washing with L/S=1) generates a pre-hydrolysate with Bricks on the order of 5 an pH=1.5, which may be mixed with the former or not, for further processing.

The pre-hydrolysate has three main applications: production of furfural by the two-state technique (dehydration of pentoses), production of ethanol (engineered *echerichia coli* bacterium) and production of xylitol (catalytic hydrogenation of D. xylose).

It should be understood that the example of reactor described together with the values mentioned are only illustrative and does not limit the protection scope of the invention.

What is claimed is:

1. An apparatus comprising:
   a sealable vessel for processing materials especially for carrying out pre-hydrolysis of a biomass or for carrying out digestion of a mineral, said sealable vessel including:
   an external shell, and
   an internal shell, the internal shell being mounted on the external shell; there being a space between the internal shell and the external shell, and a vacuum being produced in the space produced between the internal shell and the external shell,
   wherein the internal shell is a coating; and
   implosion of the coating is prevented through the vacuum maintained between the coating and the external shell so as to allow the coating and the external shell to be properly juxtaposed.

2. The apparatus according to claim 1, wherein the external shell and the internal shell are made of a structural material and corrosion resistant material, respectively.

3. The apparatus according to claim 1, wherein the external shell and internal shell are made of microbonded carbon steel and refractory metal, the latter including its alloys, respectively.

4. The apparatus according to claim 1, wherein the apparatus is used as a thermo-chemical reactor in pre-hydrolysing biomass.

5. The apparatus according to claim 1, wherein the apparatus is used as a reactor in a process of mineral digestion.

6. The apparatus according to claims 1, wherein the apparatus is used as a batch reactor.

7. The apparatus according to claim 1, wherein the external shell and the internal shell are mounted by simple juxtaposition, free from welding in the different materials.

8. The apparatus according to claim 1, wherein the external shell and the internal shell are welded together and protection rings or plates of the same metal as the coating are placed on the welding of the parts and edges.

9. The apparatus according to claim 1, further comprising at least one device for detecting and monitoring the vacuum between the external shell and the internal shell.

10. The apparatus according to claim 9, wherein the at least one detection and monitoring device detects vacuum microleakage, so as to enable one to detect microcracks in the internal shell.

11. The apparatus according to claim 9, wherein the at least one detection and monitoring device detects microcracks in a continuous way.

12. The apparatus according to claim 9, wherein the at least one detection and monitoring device detects microcracks in a scheduled intermittent manner.

13. The apparatus according to claim 9, wherein helium gas is introduced into the apparatus for detecting microcracks in the internal coating.

14. The apparatus according to claim 9, wherein microleakage detectors are coupled to the vacuum line.

15. The apparatus according to claim 1, further comprising a mechanism for generating a rotational movement in said vessel.

16. The apparatus according to claim 15, wherein the mechanism for generating a rotational movement in said vessel comprises a chain and a hydraulic motor commanded by microswitches.

17. The apparatus according 1, further comprising a helical feeder for feeding and compacting a product to be processed in the apparatus.

18. The apparatus according to claim 17, wherein the helical feeder can be uncoupled after the apparatus has been filled.

19. The apparatus according to claim 1, wherein said vessel includes a large openable cover for discharging processed solid material.

20. The apparatus according to claim 1, further comprising a tilting mechanism for tilting the vessel to permit the discharge of processed solid material.

21. The apparatus according to claim 1, further comprising a transporting cart for transporting said vessel.

22. An apparatus for processing materials especially for carrying out pre-hydrolysis of a biomass or for carrying out digestion of a mineral, comprising:
    an external shell; and
    an internal coating in juxtaposed contact with said external shell,
    wherein the external shell and the internal coating are kept in contact via a vacuum created between the external shell and the internal coating.

23. The apparatus according to claim 22 wherein said internal coating is more resistant than said external shell to biomass hydrolysis process chemical corrosion.

24. The apparatus according to claim 22 wherein said external shell is a carbon steel.

25. The apparatus according to claim 22 wherein said external shell is thicker than said internal coating.

26. The apparatus according to claim 22 wherein said internal coating is more resistant than said external shell to biomass pre-hydrolysis process or mineral digestion process chemical corrosion.

27. The apparatus according to claim 22 wherein the internal coating has a higher melt temperature than said external shell.

28. The apparatus according to claim 27 further comprising welds between said internal coating and said external shell formed in regions wherein interior reaction chamber access openings are formed in said external shell, and said apparatus further comprising sacrifice rings in weld regions to protect the internal coating from contamination by material from the lower melt temperature external shell.

29. The apparatus according to claim 22 further comprising a vacuum level monitor that monitors a change in vacuum level in a vacuum space between said external shell and coating which is indicative of a leak in said reactor.

30. The apparatus according to claim 22 wherein said external shell is formed of a carbon steel and said internal coating is formed of a corrosion resistant refractory metal selected from the group of Ti, Zr, Nb, Ta, and alloys thereof.

31. A chemical reactor, comprising:
    an external shell of a first material having an interior surface which extends, without a direct contact, about an interior corrosive chemical environment reaction region within said reactor;
    an internal shell formed of a second material different than said first material and having an inner surface and an outer surface that extend along with the interior surface of said external shell so as to also extend, in a direct contact, about the interior corrosive chemical environment reaction region of said reactor, and said outer surface of said internal shell and said interior surface of said external shell are arranged so as to define a vacuum space therebetween and are arranged in a manner which, when a vacuum is generated in said vacuum space, said outer surface of said internal shell and said interior surface of said external shell are placed in direct contact whereby said internal shell is precluded from expansion during a reaction process due to contact confinement by said external shell and the vacuum generated precludes the internal shell from imploding upon a drop in pressure in the reaction chamber.

32. The reactor according to claim 31 wherein said second material is more resistant than the first material to biomass hydrolysis process chemical corrosion.

33. The reactor according to claim 31 wherein said first material is a carbon steel.

34. The reactor according to claim 31 wherein said external shell is thicker than said internal shell.

35. The reactor according to claim 31 wherein said second material is more resistant than the first material to mineral digestion process chemical corrosion.

36. The reactor according to claim 31 wherein the second material of said internal shell has a higher melt temperature than the first material of said external shell.

37. The reactor according to claim 36 further comprising welds between said internal and external shells formed in regions wherein interior reaction chamber access openings are formed in said reactor, and said reactor further comprising sacrifice rings in weld regions to protect the internal shell from contamination by material from the lower melt temperature external shell material.

38. The reactor according to claim 31 further comprising a vacuum level monitor that monitors a change in vacuum level in said vacuum space which is indicative of a leak in said reactor.

39. The reactor according to claim 31 wherein said external shell is formed of a carbon steel and said internal shell is formed of a corrosion resistant refractory metal selected from the group of Ti, Zr, Nb, Ta, and alloys thereof.

40. A mobile reactor assembly comprising the reactor of claim 31 and a cart supporting said reactor for facilitating transportation of said reactor to a desired location.

41. The assembly of claim 40 further comprising means for feeding material to said reactor and means for tilting said reactor that are supported by said cart.

42. The assembly of claim 40 further comprising means for rotating and means for oscillating said cart.

* * * * *